United States Patent [19]

Gellert

[11] Patent Number: 4,773,154
[45] Date of Patent: Sep. 27, 1988

[54] METHOD OF MANUFACTURE OF INJECTION MOLDING NOZZLE HAVING GROUNDED HEATING ELEMENT BRAZED INTO POINTED TIP

[76] Inventor: Jobst U. Gellert, 7A Prince Street, Georgetown, Ontario, Canada, L7G 2X1

[21] Appl. No.: 127,773

[22] Filed: Nov. 30, 1987

[30] Foreign Application Priority Data

Oct. 16, 1987 [CA] Canada .................................. 549517

[51] Int. Cl.⁴ .............................................. H05B 3/00
[52] U.S. Cl. .................................... 29/611; 228/134; 228/162; 219/542; 425/549; 427/103
[58] Field of Search ................. 29/611, 460; 425/549, 425/568; 427/103; 219/542

[56] References Cited

U.S. PATENT DOCUMENTS

| | | | |
|---|---|---|---|
| 3,800,027 | 3/1974 | Tsutsumi | 425/549 |
| 4,115,686 | 9/1978 | Williams et al. | 219/544 |
| 4,516,927 | 5/1985 | Yoshida | 425/549 |
| 4,517,453 | 5/1985 | Tsutsumi | 425/549 |
| 4,643,664 | 2/1987 | Yoshida | 425/568 |
| 4,688,622 | 8/1987 | Gellert | 164/61 |

Primary Examiner—P. W. Echols
Attorney, Agent, or Firm—Riches, McKenzie & Herbert

[57] ABSTRACT

This invention relates to an improved method of making an improved injection molding nozzle having an integral electrical heating element which is grounded adjacent the corrosion and wear resistant pointed tip. A main body is made of steel with a cylindrical central portion and a tapered portion adjacent a forward recessed end. The heating element is inserted through a heating element bore drilled diagonally through the tapered portion and wound in a spiral channel machined in the surface of the central portion. A high speed steel tapered tip portion is mounted on the forward end of the main body with the exposed forward end of the heating element extending into a central heating element bore therethrough. The surfaces of the assembly are sprayed with sticky acrylic lacquer and it is then dipped in a nickel powder bath. Beads of nickel brazing paste are applied to the joints. A high speed steel insert portion is dropped into the mouth of the bore, followed by a quantity of nickel brazing powder. The assembly is then heated in a vacuum furnace which brazes it integrally together, forms a protective coating and grounds the forward end of the heating element adjacent the insert portion all in a single insertion. The nose portion is machined to have a pointed tip which is corrosion and wear resistant and can be heated to a predetermined temperature.

13 Claims, 6 Drawing Sheets

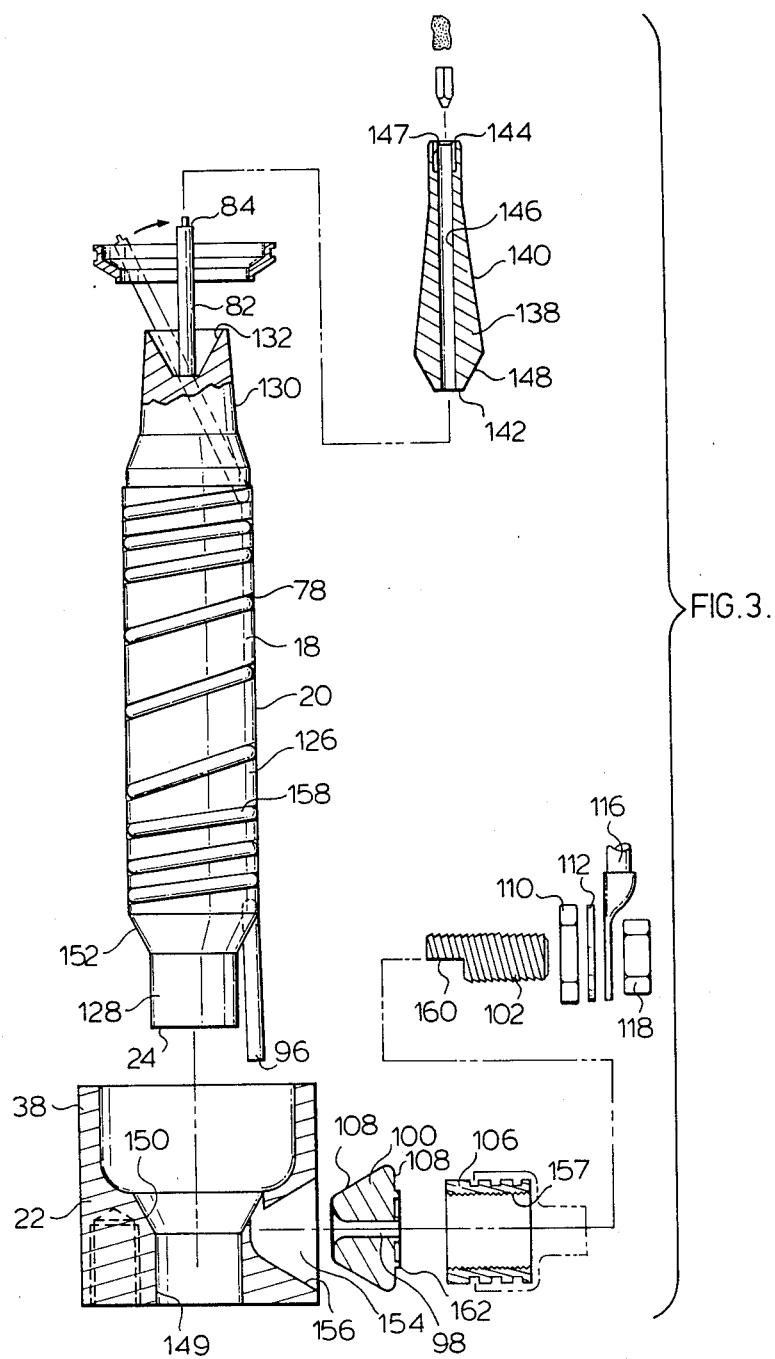

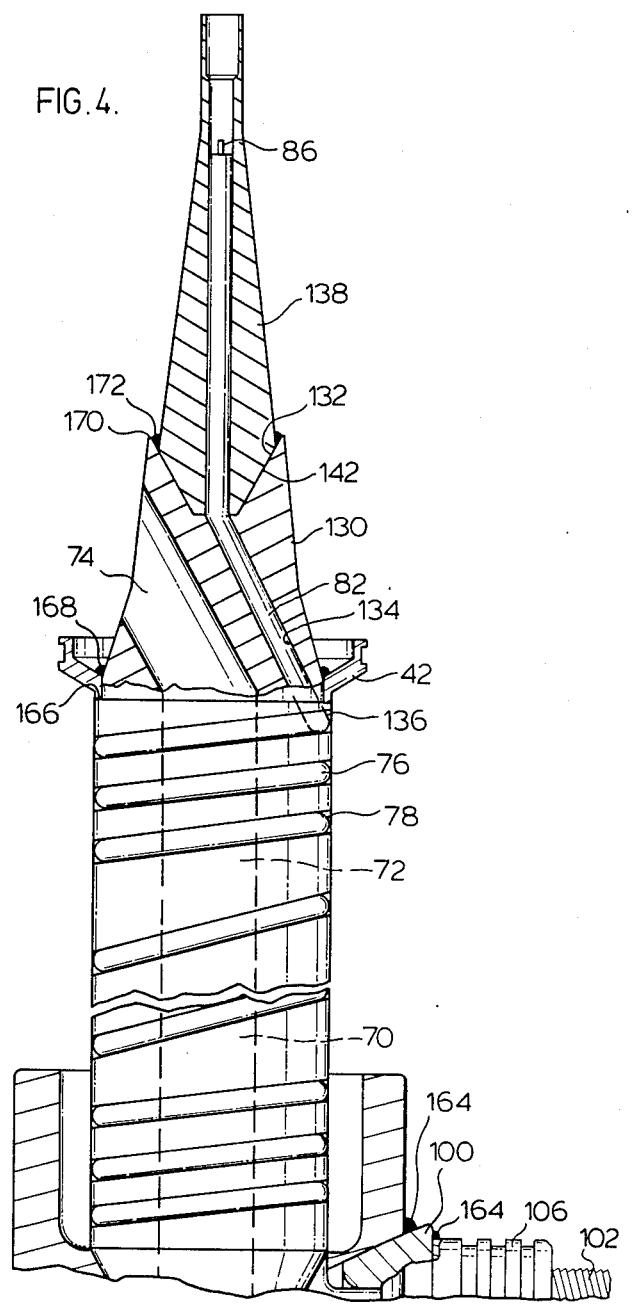

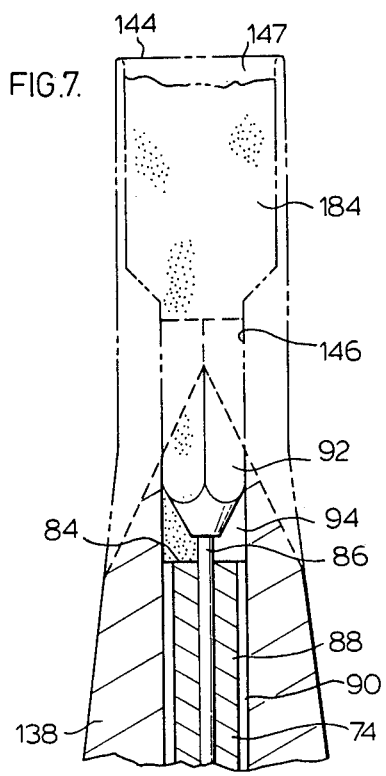
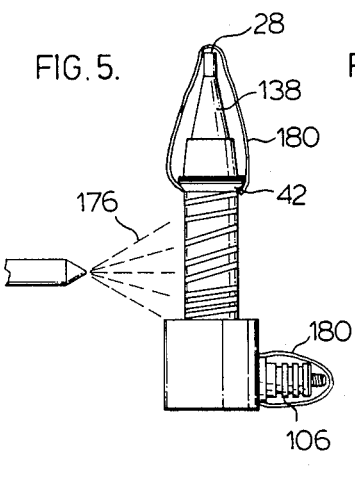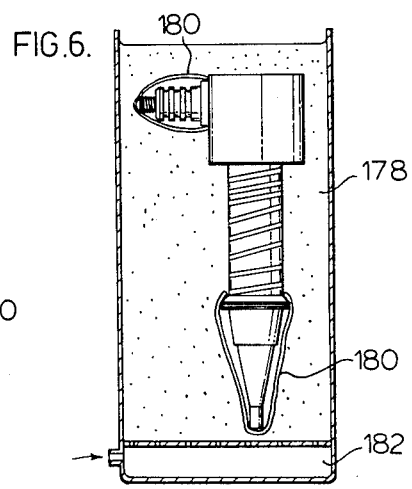

METHOD OF MANUFACTURE OF INJECTION MOLDING NOZZLE HAVING GROUNDED HEATING ELEMENT BRAZED INTO POINTED TIP

BACKGROUND OF THE INVENTION

This invention relates generally to injection molding and more particularly to a method of making an improved injection molding nozzle having an integral electrical heating element wherein the forward end of the heating element is brazed into the nose portion to ground it and heat the forward end of the nozzle.

Nozzles with integral heating elements are well known in the art. For example, the applicant's recent Canadian patent application serial number 542,185 entitled "Coated Injection Molding Nozzle and Method" filed July 15, 1987 and U.S. application Ser. No. 086,621 filed Aug. 18, 1987 disclose a nozzle in which the forward end of the heating element extends into the nose portion. It is also known to make injection molding probes having two heating elements, one of which is grounded at the pointed tip by welding. Examples of this are shown in U.S. Pat. No. 4,516,927 to Yoshida which issued May 14, 1985 and U.K. patent application No. 2,164,893A to Tsutsumi filed Aug. 25, 1985. While these previous probes are used to temperature gate the flow of melt, the fact that the melt flows around each probe between it and the surrounding cooled cavity plate necessitates the use of two heating elements so the main one can be energized continuously to avoid an unacceptable temperature drop in the melt. Forming the probes with two different heating elements and welding the tip separately is a relatively costly process.

SUMMARY OF THE INVENTION

Accordingly, it is an object of the present invention to at least partially overcome the disadvantages of the prior art by providing a method of making an injection molding nozzle having a single heating element, the forward end of which is brazed in an electrically conductive material adjacent the forward end of the nozzle at the same time as the other components of the nozzle are integrally brazed together.

To this end, in one of its aspects, the invention provides a method of making an integral elongated injection molding heated nozzle having a forward end and a rear end with a steel central portion having a generally cylindrical outer surface extending between a steel collar portion adjacent the rear end and a nose portion having a tapered outer surface adjacent the forward end, the nozzle having a melt bore with first and second portions, the first portion extending centrally from the rear end through the central portion and joining the second portion which extends diagonally to the tapered surface of the nose portion, the nozzle having an electrically insulated heating element with a rear end and a forward end, the heating element having one portion extending diagonally into the nose portion to the forward end of the heating element and another portion integrally brazed in a spiral channel in the cylindrical outer surface of the central portion, the rear end of the heating element extending out through an opening in the collar portion to a cold terminal, the heating element having a resistance wire extending centrally through an electrical insulating material in an outer casing, including forming an elongated steel main body with a forward end, a rear end, and the melt bore extending therethrough, the main body forming the central portion with the cylindrical outer surface of the central portion, drilling a heating element bore in the main body to extend diagonally from the spiral channel towards the forward end of the main body, inserting one portion of the heating element in the diagonal bore and winding another portion of the heating element in the spiral channel with the rear end of the heating element extending from the channel adjacent the rear end of the main body, forming a steel collar portion and locating it on the rear end of the main body with the rear end of the heating element extending through a radial opening in the collar portion to a cold terminal, applying a coating of binder and metallic powder to at least the cylindrical surface of the central portion, heating the assembly in a vacuum furnace for a period of time and to a temperature sufficient to melt the metallic powder and remove the binder, thereby integrally brazing the main body and the collar portion together and the heating element in the channel, and providing a protective metallic coating of substantially uniform thickness over the cylindrical surface of the central portion, the improvement including the steps of: forming an elongated steel tip portion which tapers from a larger diameter rear end to a smaller diameter forward end with a heating element bore extending centrally therethrough from a mouth at the forward end to the rear end, drilling the diagonal heating element bore in the main body to extend from the spiral channel in the forward end of the main body, forming the forward end of the main body to receive the rear end of the tip portion with the heating element bore in the tip portion connecting with the heating element bore in the main body, removing the outer casing and insulating material to expose the central resistance wire at the forward end of the heating element, inserting one portion of the heating element through the diagonal heating element bore extending through the main body with the forward end of the heating element projecting a predetermined distance from the forward end of the main body before winding another portion of the heating element in the spiral channel, sliding the tapered tip portion over the projecting forward end to a position wherein the rear end of the tip portion is received by the forward end of the main body and the heating element extends partially through the heating element bore in the tip portion to a position wherein the forward end of the heating element is a predetermined distance from the forward end of the tip portion, applying brazing material to the joint between the rear end of the tip portion and the forward end of the main body and inserting electrically conductive and corrosion resistant brazing material into the upright mouth of the heating element bore at the forward end of the tip portion, whereby when the assembly is heated in the vacuum furnace the tip portion is integrally brazed to the main body and the forward end of the heating element is brazed in the brazing material, whereby the exposed resistance wire is grounded adjacent the forward end of the tip portion, and machining the main body and the tip portion to provide the nose portion with the tapered outer surface and the forward end of the nozzle with a predetermined configuration.

Further objects and advantages of the invention will appear from the following description, taken together with the accompanying drawings.

BRIEF DESCRIPTION OF THE DRAWINGS

FIG. 3 is a partially exploded view illustrating assembly of the nozzle seen in FIG. 1;

FIG. 4 shows the tip portion mounted in place;

FIG. 5 is a schematic view illustrating the assembled nozzle being sprayed with lacquer;

FIG. 6 is a schematic view illustrating the sprayed assembly being dipped in nickel powder;

FIG. 7 shows insertion of the high speed steel insert portion and the brazing powder in the mouth of the heating element bore through the tip portion.

DETAILED DESCRIPTION OF THE DRAWINGS

Figure 1:
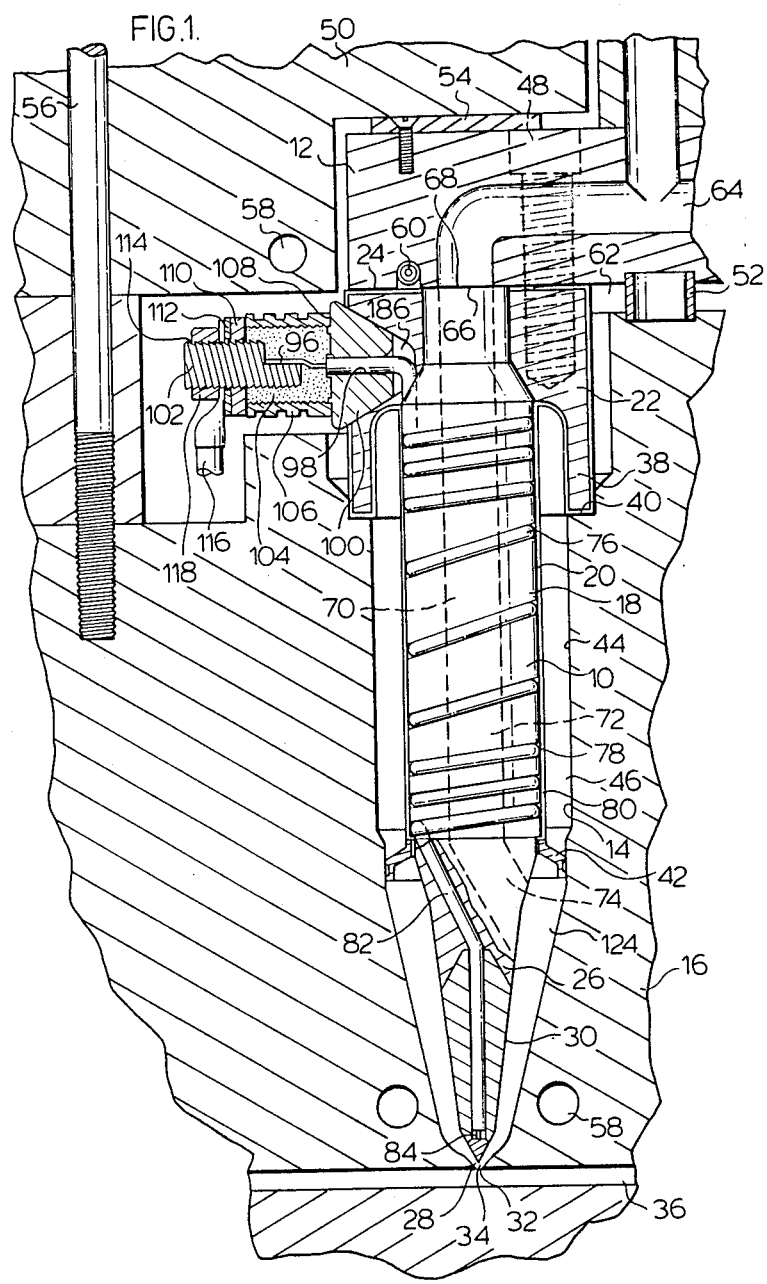
FIG. 1 is a sectional view of a portion of an injection molding system, showing a nozzle made according to a preferred embodiment of the invention.

Reference is first made to FIG. 1 which shows a portion of a multi-cavity injection molding system wherein a number of heated nozzles 10 extend from a common elongated heated manifold 12. Each heated nozzle 10 is seated in a well 14 in a cavity plate 16. The nozzle 10 has a steel central portion 18 with a generally cylindrical outer surface 20 extending between a steel collar portion 22 adjacent the rear end 24 and a steel elongated nose portion 26 adjacent the forward end 28. The nose portion 26 has a tapered outer surface 30 which leads to a pointed tip 32 at the forward end 28 which is in alignment with a gate 34 in the cavity plate 16 leading to a cavity 36.

The nozzle 10 is seated in this position in the well 14 by a circumferential insulation flange or bushing 38 which extends from the collar portion 22 and sits on a circumferential shoulder 40. The nozzle is accurately located with the pointed tip 32 in alignment with the gate 34 by a circumferential sealing and locating flange 42 which extends between the central portion 18 and the nose portion 26 to abut against the inner surface 44 of the well 14. As can be seen, other than the insulation flange 38 and the sealing and locating flange 42, the heated nozzle 10 is separated from the surrounding cooled cavity plate 16 by an insulative air space 46.

Each nozzle 10 is fastened by bolts 48 to the manifold 12 which is secured between the cavity plate 16 and a top clamp plate 50 by a locating ring 52 and a titanium pressure pad 54. The back plate 50 is held in place by bolts 56 which extend into the cavity plate 16. The back plate 50 and the cavity plate 16 are cooled by pumping cooling water through cooling conduits 58. The manifold 12 is heated by an electric heating element 60 which is cast into it as described in the applicant's U.S. Pat. No. 4,688,622 entitled "Injection Molding Manifold Member and Method of Manufacture" which issued Aug. 25, 1987. The locating ring 52 provides another insulative air space 62 between the heated manifold 12 and the cooled cavity plate 16.

The manifold 12 has a melt passage 64 which branches from a common inlet to a number of outlets 66 on the opposite side. Each outlet is in alignment with an inlet 68 to a melt bore 70 extending through one of the nozzles. Each melt bore 70 has a central portion 72 extending from the rear end 24 and a diagonal portion 74, which connects to the tapered surface 30 of the nose portion 26.

Figure 2:
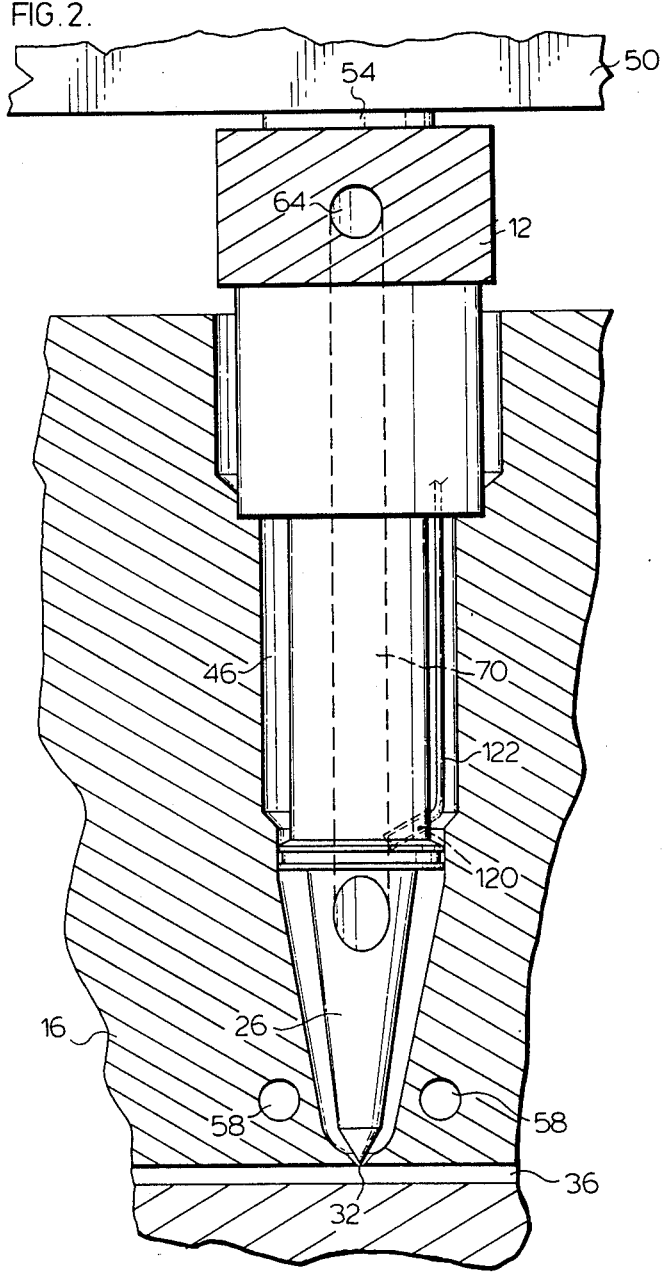
FIG. 2 is a similar sectional view of the nozzle seen in FIG. 1, showing the thermocouple location.
Figure 8:
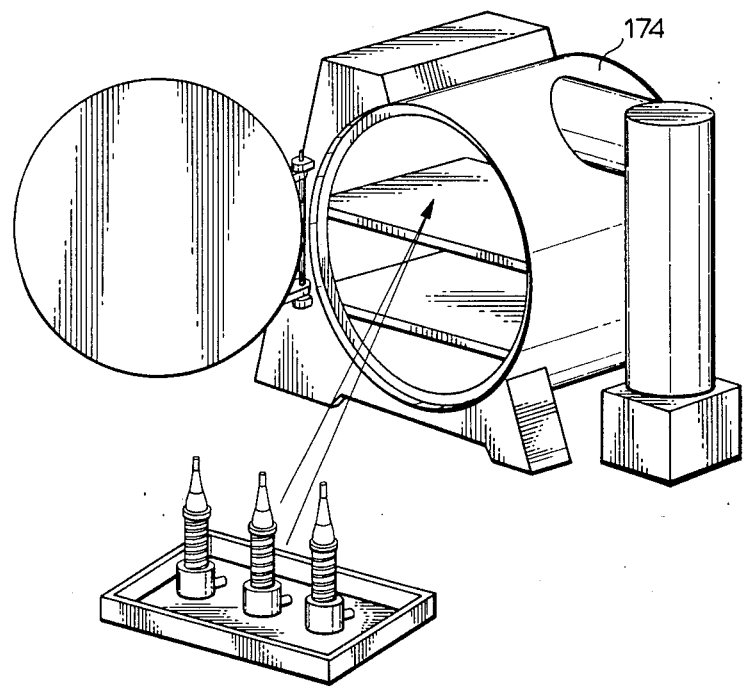
FIG. 8 illustrates a batch of assembled nozzles to be inserted into a vacuum furnace.

The nozzle 10 is heated by an electrically insulated heating element 76 which is integrally brazed in a spiral channel 78 in the cylindrical outer surface 20 of the central portion 18. The heating element 76 in the channel 78 and the outer surface 20 are covered with a protective nickel coating 80 as described in the applicant's Canadian patent application Ser. No. 542,185, mentioned above. The heating element 76 also has a portion 82 which extends diagonally into the nose portion 26 of the nozzle 10 beneath the circumferential sealing and locating flange 42 and then centrally to a forward end 84 adjacent the pointed tip 32. As clearly seen in FIG. 7, the low voltage single wire heating element 76 has a nickel-chrome resistance wire 86 extending centrally through a refractory powder electrical insulating material 88 such as magnesium oxide inside a steel casing 90. At the forward end 84 of the heating element 76, the exposed resistance wire 86 projects from the insulating material 88 and casing 90 to a high speed steel insert portion 92 which forms the pointed tip 32. As described in detail below, the exposed wire 86 and the high speed steel insert portion 92 are integrally brazed in nickel 94 which grounds the heating element 76 adjacent the pointed tip. This provides a pointed tip 32 which is corrosion and wear resistant and which can be heated by the heating element 76 to a predetermined temperature. The heating element 76 has a rear end 96 which extends out through a central bore 98 in a plug 100 received in the collar portion 22. The resistance wire 86 at the rear end 96 of the heating element 76 connects to a threaded stud 102 surrounded by ceramic insulation 104 inside a cylindrical steel sleeve 106 which is attached to the surface 108 of the plug 100. A ceramic washer 110 and a steel washer 112 are received on the projecting stud 102 to form a cold terminal 114 which receives an external power lead 116 which is held securely in place by nut 118. Thus, electrical current from the lead 116 flows through the heating element 76 to the ground at the forward end 84. This heats the nozzle 10 throughout both the central portion 18 and the nose portion 26 so that the pointed tip 32 can be heated to a predetermined temperature. The nozzle 10 has a thermocouple hole 120 which is drilled diagonally from the outer surface 20 of the central portion 18 beneath the sealing and locating flange 42. As seen in FIG. 2, this hole 120 removably receives a thermocouple 122 which extends through the air space 46 to measure the temperature during use.

In use, after the injection molding system has been assembled as shown in FIG. 1 and described above, electrical power is applied through the lead 116 to the heating element 76 in each nozzle 10 and to the heating element 60 in the manifold 12 to heat the nozzle 10 and the manifold to a predetermined operating temperature. Pressurized melt from a molding machine (not shown) is then introduced into the melt passage 64 in the manifold 12 according to a predetermined cycle in a conventional manner. The pressurized melt flows through the melt bore 70 in each nozzle 10 into the space 124 surrounding the tapered surface 30 of the nose portion 26, and then through the gate 34 and fills the cavity 36. The space 124 remains filled with melt, a portion of which solidifies adjacent the cooled cavity plate 16, and the sealing and locating flange 42 prevents it escaping into the insulative air space 46. After the cavities are filled, injection pressure is held momentarily to pack and then released. After a short cooling period, the mold is opened to eject the molded products. After, ejection, the mold is closed and injection pressure is reapplied to refill the cavity. This cycle is continuously repeated with a frequency dependent on the size and shape of the cavities and the type of material being molded.

In an alternative use of the systems when a larger diameter gate is desired and/or, an easily stringing crystalline material is being molded, temperature assisted gating can be employed. This involves controlling the flow of power to the leads 116 to the heating elements 76 in a co-ordinated cycle so that no heat is provided to the nozzles for a short period of time before and when the mold is opened. The elongated shape of each tapered nose portion 26 surrounded by the cooled cavity plate 16 results in a temperature drop in the gate area of approximately 7°-8° C./second. For most crystaline materials, a temperature drop of 20°-25° C. is sufficient to freeze the gate prior to ejection. Right after the mold is opened, electrical power is reapplied to heat the melt in the gate area to reopen the gate when injection pressure is reapplied after injection. While heat is also lost from the central portion 18 of the nozzle during the injection period, the air gap insulated steel mass surrounding the melt bore 70 retains sufficient heat so that no solidification occurs. It will be apparent that the shape and size of the nozzle and the periods of the molding cycle are critical to the success of this type of gating using only a single heating element. The central portion 18 of the nozzle 10 must have sufficient mass to retain heat, while the nose portion 26 must be sufficiently tapered and elongated and the forward end 84 of the heating element 76 brazed close enough to the pointed tip 32 that gate temperature can be lowered and raised relatively quickly.

Reference will now be made to FIGS. 3 to 8 in describing the steps involved in making the nozzle described above according to a preferred embodiment of the invention. An elongated main body 126 is cast of a tool steel such as H13 with a central portion 18 having a cylindrical outer surface 20 extending between a smaller diameter neck portion 128 at the rear end 24 and a tapered portion 130 leading to the recessed forward end 132 of the main body 126. A spiral channel 78 having varying pitches according to a predetermined configuration is cast in the cylindrical outer surface 20 of the central portion 18. As seen in FIG. 4, the central portion 72 of the melt bore 70 is drilled from the rear end 24 to join the diagonal portion 74 which is drilled in the tapered portion 130. A smaller diameter heating element bore 134 is drilled diagonally in the tapered portion 130 to connect to the end 136 of the spiral channel 78. As seen in FIG. 2, a thermocouple hole 120 is drilled diagonally beneath the locating and sealing flange 42 to receive the thermocouple 122 during use. The hole 120 is covered by a protective material to keep the nickel out during brazing.

An elongated tip portion 138 is formed of high speed steel to have an outer surface 140 which tapers from a larger diameter rear end 142 to a smaller diameter forward end 144. A heating element bore 146 is drilled centrally through the tip portion 138 and machined adjacent the forward end 144 to form a larger diameter mouth 147. As can be seen in this embodiment, the outer surface 140 is cylindrical around the mouth 147 at the forward end 144 where it is later machined. The rear end 142 of the tip portion 138 has a beveled surface 148 which matches the recessed forward end 132 of the main body 126. Thus, when the tip portion 138 is mounted on the forward end 132 of the main body 126, the heating element bore 146 through the tip portion 138 is accurately aligned with the forward end of the diagonal heating element bore 134 in the main body 126.

A cylindrical collar portion 22, a tapered plug 100 and a sleeve 106 are also made of a suitable steel, such as H13. The collar portion has a central opening 149 therethrough to snugly receive the neck portion 128 of the main body 126. The collar portion 22 is made with a circumferential insulation flange 38 which extends forward and is somewhat larger in diameter than the outer surface 20 of the central portion 18 to form an insulative air space between them. A tapered surface 150 leading to the central opening 149 matches a tapered surface 152 between the neck portion 128 and the cylindrical outer surface 20 of the central portion 18 of the main body 126. These tapered surfaces 150, 152 accurately locate the collar portion 22 on the neck portion 128 of the main body 126 and they are given a roughened finish to promote capilliary action during brazing. The collar portion 22 also has a radial opening 154 extending outwardly therethrough from the central opening 149. The radial opening has a tapered surface 156 to receive the tapered plug 100 which has a central heating element bore 98 extending therethrough. The plug 100 has an outer surface 108 which receives the sleeve 106. As described in more detail in the applicant's copending Canadian patent application Ser. No. 549,520 entitled "Method of Manufacture of Injection Molding Nozzle Electrical Terminal" filed Oct. 16, 1987, the inner surface 157 of the sleeve 106 is threaded and broached to receive the ceramic insulating material 104.

The outer casing 90 and the insulating material 88 are stripped adjacent the forward end 84 of the heating element 76 to expose approximately 0.3 mm. of the resistance wire 86. One portion 82 of the heating element 76 is then inserted through the diagonal heating element bore 134 until the forward end 84 projects a predetermined distance depending on the length of the tip portion 138. Another portion 158 of the heating element 76 is then wound in the spiral channel 78 with the rear end 96 of the heating element projecting adjacent the rear end 24 of the main body 126, as seen in FIG. 3. The plug 100 is then inserted over the projecting rear end 96 of the heating element and located firmly in place in the tapered opening 154. As the heating element 76 fits snugly in the hole 98 through the plug 100, this bends the heating element to a position wherein the rear end 96 of the heating element projects past the surface 108 of the plug 100. This projecting portion is then stripped of the casing 90 and the insulation 88 and welded to a flat surface 160 of the threaded stud 102. The sleeve 106 is then located in place around a locating flange 162 on the surface 108 of the plug 100, and the plug 100 and sleeve 106 are tack welded to retain them in this position. Beads of nickel brazing paste 164 are later applied along where the plug 100 joins the collar portion 22 and where the sleeve 106 joins the surface 108 of the plug 100.

The circumferential sealing and locating flange 42 is then inserted over the forward end 132 of the main body 126 to a position abutting against a locating shoulder 166. As described in more detail in the applicant's copending Canadian patent application Ser. No. 549,519 entitled "Injection Molding Nozzle with Resilient Sealing and Locating Flange" filed Oct. 16, 1987, this steel flange 42 is slightly resilient to form a tight seal against the inner surface 44 of the well to contain the pressurized melt during use. A bead of brazing material 168 such as nickel paste is applied along where the flange 42 joins the main body 126.

The tip portion 138 is then inserted in place over the projecting forward end 84 of the heating element 76. As described above, the beveled rear end 142 is accurately located in the recessed forward end 132 of the main body 126 and they are tack welded together to hold the tip portion 138 in place. As can be seen in FIG. 4, the forward end 132 of the main body 126 is made sufficiently larger in diameter than the rear end 142 of the tip portion 138 to form an inclined shoulder 170 where they join. Another bead 172 of nickel brazing paste is run along this inclined shoulder 170, from where it runs down between the rear end 142 of the tip portion 138 and the forward end 132 of the main body 126 when the assembly is brazed in the vacuum furnace 174.

As shown in FIGS. 5 and 6, the assembly is sprayed with a binder such as acrylic lacquer 176 and then immersed in a bath of nickel alloy powder 178 which sticks to the lacquer to coat the surfaces of the central portion 18 and the collar portion 22. Plastic covers 180 are located over the tip portion 138 and sealing and locating flange 42 as well as sleeve 106 to prevent them being coated. The melt bore 70 is also coated by brushing lacquer in and then applying the powder. While the binder 176 is preferably an acrylic lacquer which volatizes when heated in the vacuum furnace 174, other suitable binders may be used. The powder 178 is preferably nickel or an alloy thereof, but other suitable metals which form a conductive and protective coating may be used. In this embodiment, the powder 178 is agitated by aeration from the bottom 182 to provide a fluidized bath to ensure the assembly is completed coated. While the preferred method is to apply this coating by successively spraying the assembly with the liquid and then dipping it in the powder, it can be applied in one step by mixing the powder in the liquid before application. After the coating has been applied, the assembly is oriented with the forward end 28 upright and the high speed steel insert portion 92 is inserted into the mouth 147 at the forward end 144 of the tip portion 138. As best seen in FIG. 7, the insert portion 92 drops into the heating element bore 146 and rests against the exposed wire 86 at the forward end 84 of the heating element 76. A predetermined quantity of nickel alloy powder 184 is inserted into the mouth 147 on top of the high speed steel insert portion 92. The insert portion 92 has a square cross section so that it is located in the heating element bore 146, but has spaces between it and the surrounding bore.

The coated assemblies are then loaded in batches into a vacuum furnace 174. In this embodiment, as the furnace is gradually heated to a temperature of approximately 1,925° F., the furnace is evacuated to a relatively high vacuum to remove substantially all the oxygen. When the coating is heated, the binder is volatized, but the nickel alloy remains in place. Before the melting temperature of the nickel alloy is reached, the vacuum is reduced by partially backfilling with an inert gas such as argon or nitrogen. When the nickel alloy melts, it flows by capilliary action around the roughened surface of the heating element 76 to completely fill the spiral channel 78 and integrally embed the heating element 76. The molten nickel alloy also flows into the space 186 around the neck portion 128 and the brazing paste 164 melts and flows around the plug 100 and the end of the sleeve 106. Similarly the brazing material 168 flows around the circumferential flange 42 and the brazing paste 172 melts and flows down between the rear end 142 of the tip portion 138 and the forward end 132 of the main body 126. These surfaces are roughened to promote capilliary flow of the nickel alloy between them. The nickel alloy powder 184 in the mouth 147 melts and flows down around the insert portion 92 to completely embed it as well as the exposed end of the wire 86. Thus, the tip portion 138 and the collar portion 22 are integrally brazed to the main body 126. The heating element 76 is brazed in the spiral channel 78 and the diagonal heating element bore 134 and the central bore 146 through the tip portion 138. Of course, the exposed wire 86 is electrically grounded in the surrounding nickel alloy adjacent the high speed steel insert portion 92 so that the forward end 28 of the nozzle 10 can be heated in a predetermined temperature. The nickel alloy powder on the surfaces of the assembly provides a complete protective coating 80 of nickel alloy having a substantially uniform thickness, including the surfaces of the melt bore 70. Brazing the assembly in a vacuum provides a metallurgical bonding of the nickel alloy to the steel which improves the efficiency of the heat transfer from the heating element 76 as well as the adherence of the protective coating. Thus an integral structure is provided which sufficiently transfers heat from the heating element and distributes it more uniformly along the melt bore. As can be seen, the pitch or heat profile of the heating element 76 varies along its length to provide more heat at the ends of the nozzle than in the middle where there is less heat loss. This profile can be precisely controlled for any particular application by varying the pattern of the spiral channel 78 which is cast in the outer surface 20 of the main body 126. Joining the components of the assembly together, forming the protective coating 80, grounding the forward end 84 of the heating element 76, and heat treating all in a single insertion in the vacuum furnace facilitates considerably the manufacture of an improved nozzle.

After the nozzles 10 are cooled and removed from the vacuum furnace 174, they are machined to form the tapered outer surface 30 of the nose portion 26 and the pointed tip 32. As may be seen, the pointed tip 32 is formed of high speed steel which is both corrosion and wear resistant which increases the operating life of the nozzle. The ceramic insulating material 104 is then poured into the sleeve 106 around the threaded stud 102. After the ceramic material has hardened, the ceramic washer 110 and steel washer 112 are located on the projecting stud 102 and the nut 118 attaches the electrical lead 116 during use.

While the description of making the nozzle has been given with respect to a particular embodiment, it is not to be construed in a limiting sense. Variations and modifications will occur to those skilled in the art. For instance, the exposed resistance wire 86 at the forward end of the heating element can be brazed in nickel alloy to form a pointed tip 32 without the use of a high speed steel insert portion 92. This also provides the nozzle with a pointed tip which is corrosion and wear resistant and can be heated to a predetermined temperature as described above. The tip portion 138 can have a different shape and the forward end 28 of the nozzle can be machined to have a different shape to provide a nozzle suitable for edge gating, as described in the applicant's Canadian patent application Ser. No. 549,518 entitled "Injection Molding Nozzle having Grounded Heating Element Brazed into pointed Tip" filed Oct. 16, 1987. Reference is made to the appended claims for a definition of the invention.

What I claim is:

1. In a method of making an integral elongated injection molding heated nozzle having a forward end and a rear end with a steel central portion having a generally cylindrical outer surface extending between a steel collar portion adjacent the rear end and a nose portion having a tapered outer surface adjacent the forward end, the nozzle having a melt bore with first and second portions, the first portion extending centrally from the rear end through the central portion and joining the second portion which extends diagonally to the tapered surface of the nose portion, the nozzle having an electrically insulated heating element with a rear end and a forward end, the heating element having one portion extending diagonally into the nose portion to the forward end of the heating element and another portion integrally brazed in a spiral channel in the cylindrical outer surface of the central portion, the rear end of the heating element extending out through an opening in the collar portion to a cold terminal, the heating element having a resistance wire extending centrally through an electrical insulating material in an outer casing, including forming an elongated steel main body with a forward end, a rear end, and the melt bore extending therethrough, the main body forming the central portion with the cylindrical outer surface of the central portion, drilling a heating element bore in the main body to extend diagonally from the spiral channel towards the forward end of the main body, inserting one portion of the heating element in the diagonal bore and winding another portion of the heating element in the spiral channel with the rear end of the heating element extending from the channel adjacent the rear end of the main body, forming a steel collar portion and locating it on the rear end of the main body with the rear end of the heating element extending through a radial opening in the collar portion to a cold terminal, applying a coating of binder and metallic powder to at least the cylindrical surface of the central portion, heating the assembly in a vacuum furnace for a period of time and to a temperature sufficient to melt the metallic powder and remove the binder, thereby integrally brazing the main body and the collar portion together and the heating element in the channel, and providing a protective metallic coating of substantially uniform thickness over the cylindrical surface of the central portion, the improvement including the steps of:

(a) forming an elongated steel tip portion which tapers from a larger diameter rear end to a smaller diameter forward end with a heating element bore extending centrally therethrough from a mouth at the forward end to the rear end, (b) drilling the diagonal heating element bore in the main body to extend from the spiral channel in the forward end of the main body, (c) forming the forward end of the main body to receive the rear end of the tip portion with the heating element bore in the tip portion connecting with the heating element bore in the main body, (d) removing the outer casing and insulating material to expose the central resistance wire at the forward end of the heating element, (e) inserting one portion of the heating element through the diagonal heating element bore extending through the main body with the forward end of the heating element projecting a predetermined distance from the forward end of the main body before winding another portion of the heating element in the spiral channel, (f) sliding the tapered tip portion over the projecting forward end to a position wherein the rear end of the tip portion is received by the forward end of the main body and the heating element extends partially through the heating element bore in the tip portion to a position wherein the forward end of the heating element is a predetermined distance from the forward end of the tip portion, (g) applying brazing material to the joint between the rear end of the tip portion and the forward end of the main body and inserting electrically conductive and corrosion resistant brazing material into the upright mouth of the heating element bore at the forward end of the tip portion, whereby when the assembly is heated in the vacuum furnace the tip portion is integrally brazed to the main body and the forward end of the heating element is brazed in the brazing material, whereby the exposed resistance wire is grounded adjacent the forward end of the tip portion and (h) machining the main body and the tip portion to provide the nose portion with the tapered outer surface and the forward end of the nozzle with a predetermined configuration.

2. A method as claimed in claim 1 further including inserting a high speed steel insert portion as well as brazing powder into the mouth of the heating element bore at the forward end of the tip portion, whereby when the assembly is heated in the vacuum furnace the high speed steel insert portion is integrally brazed in place adjacent the grounded forward end of the heating element, and machining the integral high speed steel to form a corrosion resistant pointed tip at the forward end of the nozzle.

3. A method as claimed in claim 2 including stripping the outer casing and insulating material to leave the central resistance wire projecting a predetermined distance at the forward end of the heating element.

4. A method as claimed in claim 3 wherein the brazing material is nickel.

5. A method as claimed in claim 4 including brazing an outwardly projecting circumferential sealing and locating flange on the nozzle between the central portion and the nose portion.

6. A method as claimed in claim 5 wherein the central portion of the nozzle is made with sufficient mass and the tapered nose portion is made sufficiently elongated whereby controlling electrical power to the heating element with the forward end integrally brazed adjacent the forward end changes the melt temperature in the gate area sufficiently rapidly to provide temperature assisted gating.

7. A method as claimed in claim 6 including making the main body with a neck portion adjacent the rear end, forming a steel collar portion having an opening therethrough to snugly receive the neck portion of the main body therein, and applying brazing material whereby the collar portion is integrally brazed to the main body when the assembly is heated in the vacuum furnace.

8. A method as claimed in claim 7 including making the main body with a tapered portion adjacent the forward end through which the diagonal heating element bore is drilled.

9. A method as claimed in claim 8 including making the forward end of the main body recessed to receive the rear end of the elongated tip portion.

10. A method as claimed in claim 9 including making the forward end of the main body sufficiently larger in diameter than the rear end of the tip portion to provide a shoulder where they join and applying a bead of brazing material around the shoulder prior to insertion into the vacuum furnace.

11. A method as claimed in claim 10 including forming the tip portion of high speed steel.

12. A method as claimed in claim 11 including machining the brazing powder receiving mouth at the forward end of the heating element bore through the tip insert to enlarge the diameter of the mouth.

13. A method as claimed in claim 3 including tack welding the rear end of the tip portion to the forward end of the main body to hold the tip portion in place prior to brazing.

* * * * *